US010701863B2

(12) United States Patent
Foster et al.

(10) Patent No.: US 10,701,863 B2
(45) Date of Patent: Jul. 7, 2020

(54) HEADER IDENTIFICATION IN A HARVESTING MACHINE

(71) Applicant: MacDon Industries Ltd., Winnipeg (CA)

(72) Inventors: Benjamin Foster, Winnipeg (CA); Michael Flintoft, Winnipeg (CA); Sivian Loevsky, Winnipeg (CA); John Baldwin, Winnipeg (CA); Leonard Bergman, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 281 days.

(21) Appl. No.: 15/904,058

(22) Filed: Feb. 23, 2018

(65) Prior Publication Data
US 2019/0261554 A1 Aug. 29, 2019

(51) Int. Cl.
A01D 34/00 (2006.01)
A01D 41/16 (2006.01)
A01D 41/14 (2006.01)
A01D 75/18 (2006.01)

(52) U.S. Cl.
CPC ......... A01D 41/141 (2013.01); A01D 34/008 (2013.01); A01D 75/185 (2013.01); A01D 41/16 (2013.01)

(58) Field of Classification Search
CPC .. A01D 34/008; A01D 34/001; A01D 41/141; A01D 41/16; A01D 41/127; A01D 41/1274; A01D 75/185
See application file for complete search history.

(56) References Cited

U.S. PATENT DOCUMENTS 6,519,923 B1 * 2/2003 Cooksey ................ A01B 71/08
56/14.9
2017/0049045 A1 * 2/2017 Wilken .................. A01D 41/06

* cited by examiner

Primary Examiner — Alicia Torres
Assistant Examiner — Adam J Behrens
(74) Attorney, Agent, or Firm — Ryan W. Dupuis; Ade + Company Inc.; Kyle R. Satterthwaite

(57) ABSTRACT

A controller on a harvester vehicle is arranged to automatically identify a header in electrical communication with the vehicle upon key activation of the harvester vehicle. Programming instructions on the controller can generate notifications to the user based upon a state of activation of the float mechanism and the state of header identity detection. The controller also prompts the user to confirm the identity of the header if the detected identity of the header has changed. The controller also uses header identity to log usage hours of the header on the computer controller in association with the identity of the header such that maintenance schedules for a plurality of different headers interchangeably used on a common harvester vehicle can be tracked.

17 Claims, 3 Drawing Sheets

HEADER IDENTIFICATION IN A HARVESTING MACHINE

FIELD OF THE INVENTION

The present invention relates to a harvesting machine including a controller which is arranged to automatically identify an identity of an agricultural header supported on the harvesting machine, and more particularly, the present invention relates to features on the controller for performing various autonomous actions based on the automatically identified identity of the header.

BACKGROUND

In a typical windrower, a harvesting vehicle supports a header thereon such that the header can be operated in a floating mode engaged upon the ground using a floating mechanism which carries most of the weight of the header on the harvester vehicle while enabling the header to float in height relative to the harvester vehicle so that the header can follow the contours of the ground with the engagement of the ground providing the remaining lifting forces for supporting the header. One particular problem associated with a float mechanism of this type is the potential for damage to the header if the header is connected to the harvester vehicle but the float remains inactive. Alternatively, when disconnecting the header, maintaining the float mechanism in an active state places considerable stress on the mechanical mounts which can also result in damage to the header.

SUMMARY OF THE INVENTION

According to one aspect of the invention there is provided, a harvesting machine comprising:

a harvesting vehicle mounted on ground wheels for movement across ground carrying a crop for harvesting;

a header having a cutter bar for cutting the crop and a crop transport device for transporting the cut crop to a collection location of the header;

a mounting assembly supporting the header on the harvesting machine;

the mounting assembly including a float actuator operable between an inactive state in which the header is rigidly supported relative to the harvesting vehicle and an active state in which the float actuator applies a variable lifting force to the header throughout a range of floating movement of the header relative to the harvesting vehicle such that the header is partially supported by ground lifting forces from the header being engaged upon the ground in the active state;

a computer controller on the harvesting vehicle including a memory storing programming instructions thereon and a processor for executing the programming instructions stored on the memory;

the computer controller being in communication with the float actuator so as to be arranged to determine when the float actuator is in the active state and when the float actuator is in the inactive state; and a communication element on the header arranged to connect with the computer controller independently of the mounting assembly supporting the header on the harvesting vehicle;

the improvement comprising:

the computer controller being arranged to automatically identify the header when the communication element of the header is connected with the computer controller in which the communication element outputs an identification signal to the computer controller representative of the identity of the header; and the programming instructions being executable by the processor so as to be arranged to generate a notification to the user responsive to notification criteria stored on the computer controller being met, wherein the notification criteria comprises at least one of:

(i) the computer controller receiving the identification signal from the communication element on the header while the float actuator is determined to be in the inactive state; or (ii) the computer controller determining that the communication element on the header is not connected with the computer controller while the float actuator is determined to be in the active state.

Use of the status of the float mechanism and the identification of the header as notification criteria is effective at preventing damage to the header either from attempting to operate the header while the float mechanism is inactive or attempting to detach the header while the float mechanism remains active.

In one instance, the notification criteria specifically comprises the computer controller receiving the identification signal from the communication element on the header while the float actuator is determined to be in the inactive state and the notification is a prompt delivered to the user to activate the float actuator. In another instance, the notification criteria specifically comprises the computer controller determining that the communication element on the header is not connected with the computer controller while the float actuator is determined to be in the active state and the notification is a prompt delivered to the user to deactivate the float actuator. Preferably, both criteria are stored on the controller such that a notification is generated if either one of the noted criteria are met.

When a key activation device is provided on the harvesting computer to enable operation of the harvesting vehicle when activated, the programming instructions on computer controller may be arranged to automatically identify the header subsequent to the key activation device being activated. More particularly, the programming instructions may be arranged to only identify the header immediately subsequent to the key activation device being activated.

When the harvesting machine further comprises a float sensor arranged to determine a status of the float actuator and output a float signal to the computer controller representative of the status of the float actuator, the notification criteria may further require confirmation that the float sensor is functioning prior to generation of the notification to the user.

When a prescribed float value is stored on the computer controller in association with the identity of the header, the programming instructions may be arranged to operate the float actuator such that the variable lifting force corresponds to the prescribed float value associated with the identity of the header subsequent to determination of the identity of the header.

The computer controller of the harvesting machine may further comprise a programmable input adapted to return operation of an operating characteristic of the header to a prescribed preset value when actuated. In this instance the prescribed preset value is preferably stored on the computer controller in association with the identity of the header, and the programming instructions are preferably arranged to assign the prescribed preset value to the programmable input in response to determination of the identity of the header.

When the mounting assembly is arranged to adjust a height of the header relative to the harvesting vehicle in a raised position of the header and the operating characteristic of the programmable input comprises said height of the header, the prescribed preset value stored in association with the identity of the header may be a height value for returning the header to the height value when the programmable input is actuated.

When the header further comprises a cutter motor for operating the cutter bar at a prescribed header speed dictated by the computer controller, a header speed value may be stored on the computer controller in association with the identity of the header such that the programming instructions are arranged to recall the header speed value for operating the cutter motor at said header speed value in response to determination of the identity of the header.

When the computer controller comprises a cut width setting stored thereon for identifying a cutting width of the header, a cutting width value may be stored on the computer controller in association with the identity of the header such that the programming instructions are arranged to assign the cutting width value stored in association with the identity of the header as the cut width setting in response to determination of the identity of the header.

When the computer controller comprises an attachment setting stored thereon for identifying an operational characteristic of an attachment supported on the harvesting vehicle, an attachment value may be stored on the computer controller in association with the identity of the header such that the programming instructions are arranged to assign the attachment value stored in association with the identity of the header as the attachment setting in response to determination of the identity of the header.

According to a second aspect of the present invention there is provided a harvesting machine comprising:

a harvesting vehicle mounted on ground wheels for movement across ground carrying a crop for harvesting;

a header having a cutter bar for cutting the crop and a crop transport device for transporting the cut crop to a collection location of the header;

a mounting assembly supporting the header on the harvesting machine;

a computer controller on the harvesting vehicle including a memory storing programming instructions thereon and a processor for executing the programming instructions stored on the memory;

a communication element on the header arranged to connect with the computer controller independently of the mounting assembly supporting the header on the harvesting vehicle;

the improvement comprising:

the computer controller being arranged to automatically identify the header when the communication element of the header is connected with the computer controller in which the communication element outputs an identification signal to the computer controller representative of the identity of the header; and the programming instructions being executable by the processor so as to be arranged to:

(i) store a current identity of the header on the computer controller upon receipt of the identification signal;

(ii) compare the current identity of the header to a previously stored identity of the header to determine if the identity of the header has changed;

(iii) prompt the user through an operator interface of the computer controller to confirm the identity of the header if the identity of the header has changed.

By prompting the user when a change in header identity is detected, the header is protected from identification errors which could otherwise cause damage to the header. For example, if a pin contact error results in misidentification of the header, the operator is prompted with an opportunity to force the controller to recognize the proper header attached to the harvesting vehicle instead of the controller automatically applying preset values for various operational characteristics of a different header to the currently attached header.

When the harvesting machine further includes a key activation device to enable operation of the harvesting vehicle when activated, the programming instructions on computer controller may be further arranged to automatically identify the header only immediately subsequent to the key activation device being activated.

Subsequent to prompting the user to confirm the identity of the header, the programming instructions on the computer controller may be further arranged to determine the identity of the header as the previously stored identity of the header instead of the identity that corresponds to the identification signal from the communication element responsive to an operator command received through the operator interface.

According to a further aspect of the present invention there is provided a harvesting machine comprising:

a harvesting vehicle mounted on ground wheels for movement across ground carrying a crop for harvesting;

a header having a cutter bar for cutting the crop and a crop transport device for transporting the cut crop to a collection location of the header;

a mounting assembly supporting the header on the harvesting machine;

a computer controller on the harvesting vehicle including a memory storing programming instructions thereon and a processor for executing the programming instructions stored on the memory;

a communication element on the header arranged to connect with the computer controller independently of the mounting assembly supporting the header on the harvesting vehicle;

the improvement comprising:

the computer controller being arranged to automatically identify the header when the communication element of the header is connected with the computer controller in which the communication element outputs an identification signal to the computer controller representative of the identity of the header; and the programming instructions being executable by the processor so as to be arranged to log usage hours of the header on the computer controller in association with the identity of the header.

By logging usage hours of the harvester vehicle according to header identity, the user can collect effective usage data for multiple different headers being used interchangeably on the same harvester vehicle. Tracking usage of individual headers is particularly useful for performing routine maintenance on multiple different header is at properly scheduled intervals.

The computer controller may also include maintenance data stored thereon in association with the identity of the header in which the maintenance data relates to a maintenance schedule representative of maintenance notifications to be generated by the computer based upon a number of hours of operation of the header. In this instance, the programming instructions on the computer controller are preferably arranged to compare only the usage hours logged in association with the identify of the header to the maintenance data associated with the identity of the header in the generation of the maintenance notifications.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
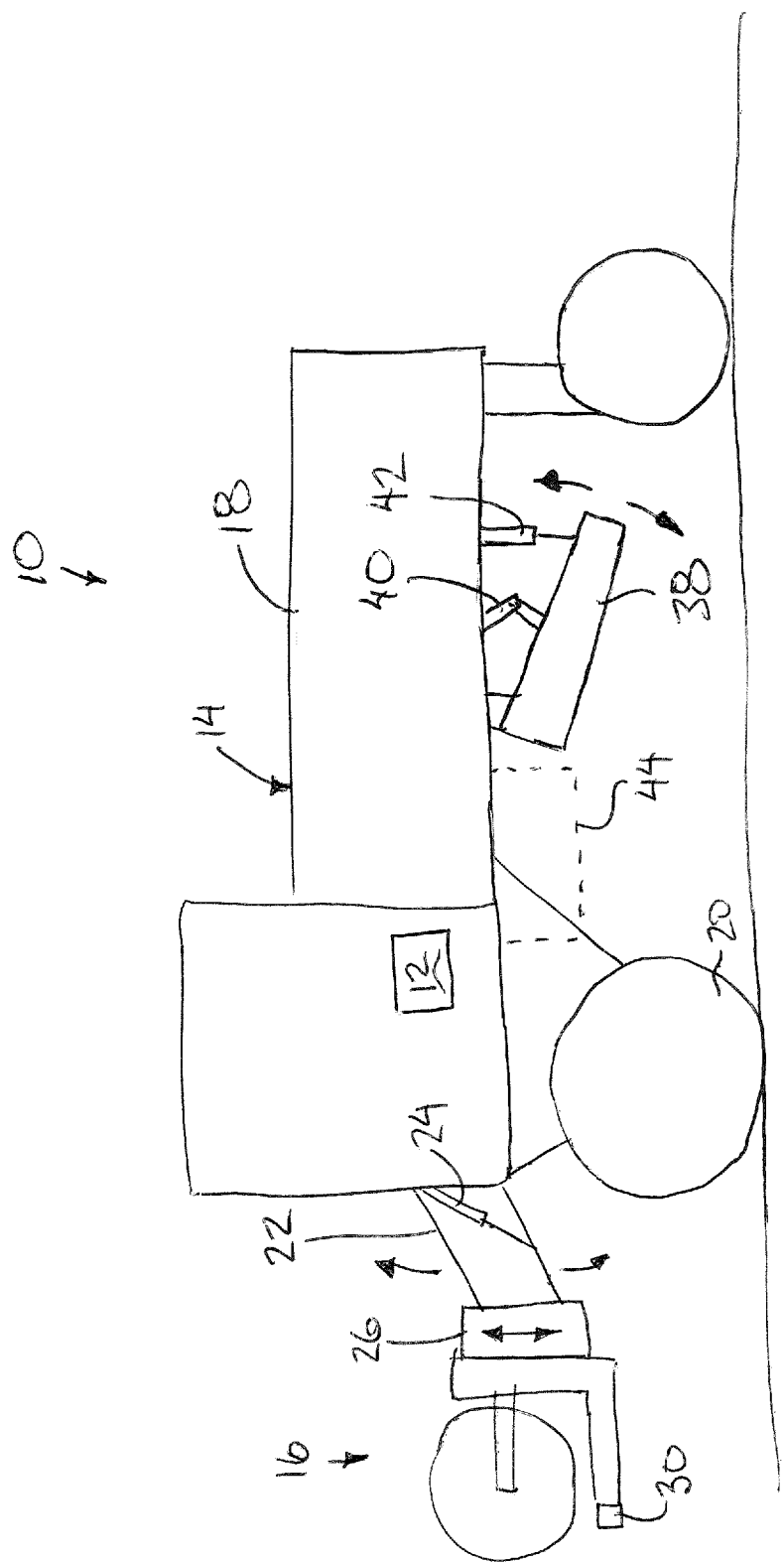
FIG. 1 is a schematic side elevational view representative of a harvesting machine according to the present invention.
Figure 2:
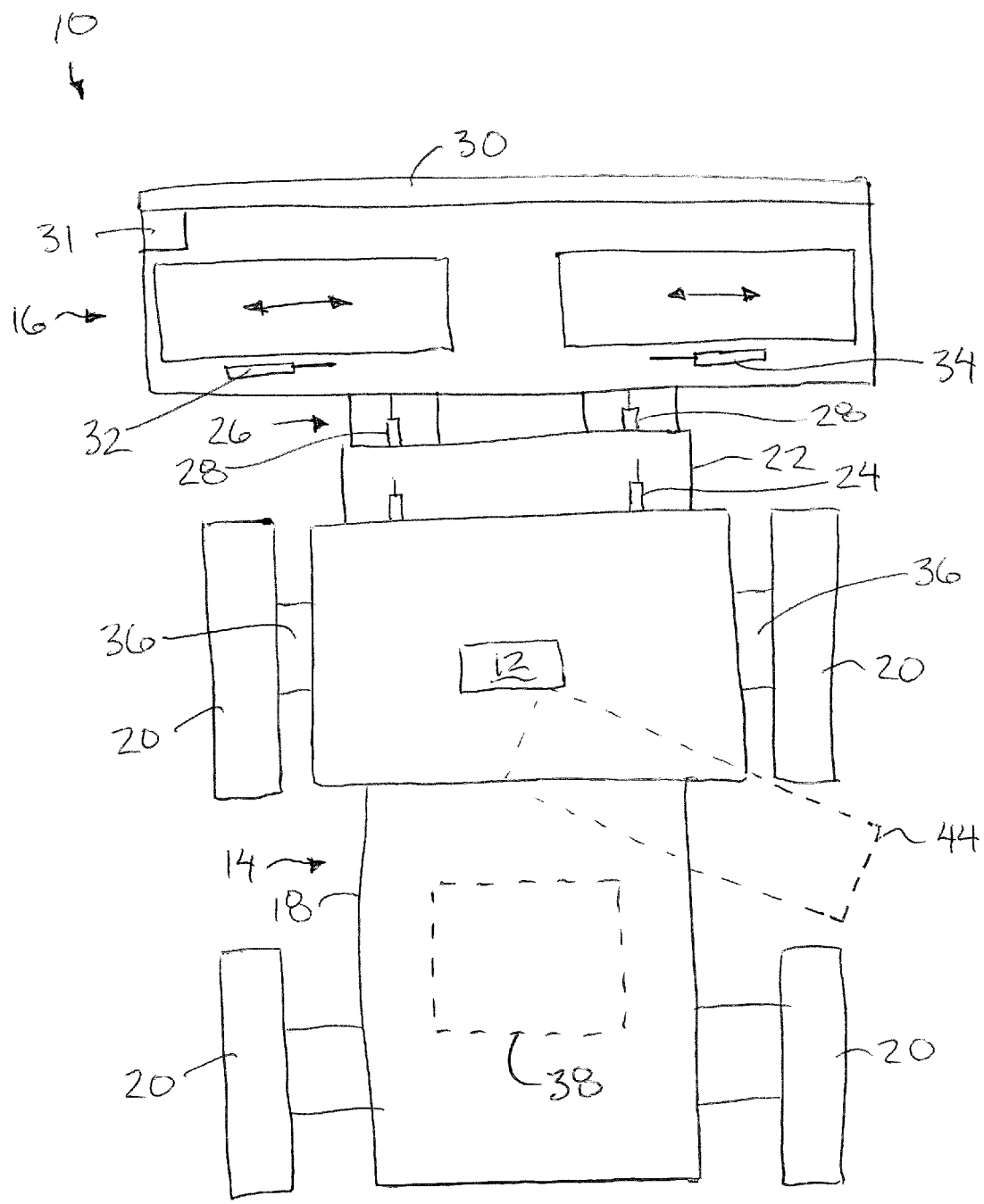
FIG. 2 is a schematic top plan view representative of the harvesting machine.
Figure 3:
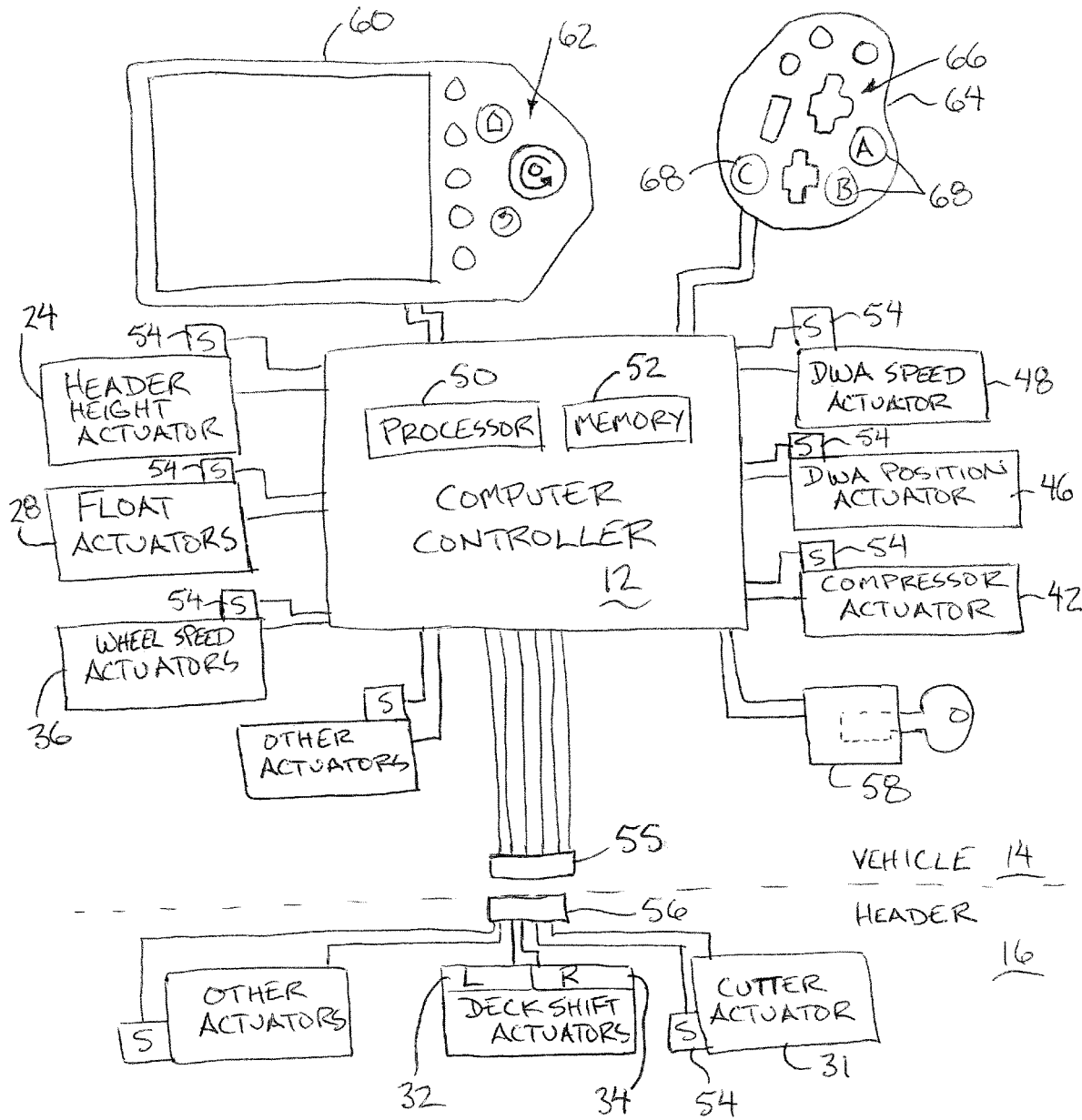
FIG. 3 is a schematic representation of a computer controller of the harvesting machine.

Referring to the accompanying figures there is illustrated an agricultural harvesting machine, for example a windrower, generally indicated by reference numeral 10. Details of the main construction of the header and of the harvesting vehicle are omitted since these are well known to one skilled in the art. The present arrangement is concerned primarily with the configuration of the computer controller 12 of the harvesting machine for controlling operation of various functions or operating characteristics of the machine.

The harvesting machine 10 typically includes a harvesting vehicle 14 and a header 16 releasably supported on the vehicle by a suitable mounting assembly as described in further detail below. The harvesting vehicle 15 comprises a frame 18 supported on ground wheels 20 for rolling movement across ground carrying a crop for harvesting. An engine (not shown) is supported on the frame which drives one or more hydraulic pumps (not shown) for supplying hydraulic fluid to various operational actuators described in further detail below to drive the operation of various operating characteristics of the machine. Supply of hydraulic fluid to the actuators is controlled by electronically controlled values which receive command signals from the computer controller.

The mounting assembly generally includes a lift frame 22 at the forward end of the vehicle frame for supporting the header 16 thereon such that the height of the header relative to the harvesting vehicle and relative to the ground can be adjusted by adjusting the height of the lift frame 20 using a suitable lift actuator 24.

The mounting assembly also incorporates a float suspension 26 therein using springs which support the header throughout a range of floating movement of the header relative to the lift frame 22. A float actuator 28 cooperates with the springs to vary the lifting force provided by the springs in an active state of the float actuator. The float actuator typically comprises left and right linear hydraulic actuators at laterally spaced apart positions for cooperating with respective springs to support the header on the lift frame for floating movement. In the inactive state of the float actuators, the spring suspension is intended to bottom out such that the header is rigidly supported on the lift frame for movement together with the lift frame relative to the harvesting vehicle. When the float actuator is inactive, the lift frame can be lowered to deposit the header on the ground to allow for disconnection of the header from the lift frame. In the active state of the float actuator, the float actuator applies a variable lifting force to the header throughout a range of floating movement of the header relative to the harvesting vehicle such that the header is partially supported by ground lifting forces from the header being engaged upon the ground in the active state.

The header 16 includes a cutter bar 30, for example a sickle knife, which spans the lower leading edge of the header for cutting crop. The header typically also includes a crop transport device for transporting the cut crop to a collection location of the header.

In the illustrated embodiment the transport device may include a set of drapers including a left side draper 32 and a right side draper 34. The drapers are supported on respective decks which can be shifted laterally relative to a frame of the header between a central discharge configuration, a left side district configuration, and a right side discharge configuration. In the central discharge configuration, the drapers are positioned towards laterally opposing ends of the header for discharging centrally towards one another to a central discharge location. In the left side discharge configuration, the right side draper remains at the end of the header, however the left side draper is shifted to close the gap between the drapers and create a left side discharge opening on the header so that both drapers transport crop end to end with one another across the length of the header to the left side discharge opening. In the right side discharge configuration, the left side draper remains at the end of the header, however the right side draper is shifted to close the gap between the drapers and create a right side discharge opening on the header so that both drapers transport crop end to end with one another across the length of the header to the right side discharge opening.

The various operating characteristics of the harvesting machine, including the lift actuator 24 and the float actuator 28 noted above, are supported on the vehicle 14 in some instances and on the header in other instances.

In addition to the lift actuator 24 and the float actuator 28 which are supported on the harvesting vehicle 14, other actuators supported on the vehicle include wheel actuators 36 in the form of hydraulic motors which drive the rotation of the ground wheels.

Typically, the harvesting vehicle is used together with a crop compressor 38 in the form of a deflector panel supported for movement relative to the vehicle frame by a suitable linkage so that the crop compressor can be adjusted in height through a range of heights relative to the vehicle frame. A compressor height actuator 42 is incorporated into the linkage 40 to allow the crop compressor to be adjusted in height through the range of heights. Typically, the crop compressor is lowered into a working position at a prescribed height for engaging a windrow deposited by the harvesting vehicle for compressing the windrow against the ground. When turning the harvesting vehicle within a headland area where it is desirable for the compressor to pass over previously laid windrows, the crop compressor can be lifted to an intermediate height providing suitable clearance to pass over the windrows on the ground. To minimize unnecessary lifting of the compressor, an intermediate height is typically selected which is spaced below the uppermost height of the compressor so that the fully raised position of the compressor is used only when the compressor is to be positioned out of use.

In further instances, a double windrow attachment 44 may be supported on the harvesting machine 10. The double windrow attachment option is generally not used with a header of the type comprising drapers as illustrated, for example disc cutter headers and the like.

The double windrow attachment 44 includes an attachment frame supported on the vehicle frame rearward of the header for communication with the collection location of the header. A conveyor belt is supported for rotation on the attachment frame in the conventional manner of a double windrow attachment for transporting crop from the collection location of the header to an outlet of the double windrow attachment which is laterally offset to one side of the harvesting vehicle rearwardly of one end of the header. The attachment frame is movable in height relative to the vehicle frame. A DWA position actuator 46 is operatively connected between the attachment frame and the vehicle frame in the form of a linear hydraulic actuator which extends and retracts for varying the height of the attachment frame between a lowered working position in which the outlet end is in proximity to the ground for depositing a windrow on the ground and a raised position in which the outlet end is raised upwardly in relation to the lowered working position for when the double windrow attachment is out of use. A belt speed actuator 48 is also mounted on the attachment frame in the form of a hydraulic motor which controls a speed of operation of the conveyor which transports the crop from the collection location on the header to the outlet end of the attachment frame.

Other operational characteristics comprise operational actuators which are supported on the header. These include the left and right draper position actuators 32 and 34 in the instance of a draper header. The actuators on the header also include a cutter actuator 31 in the form of a hydraulic motor for driving reciprocation of the sickle knife of the cutter bar 30. In alternative arrangements, the cutter actuator may drive the disc speed in a disc cutter header. Various additional actuators on the header may be provided for controlling reel speed, reel height, and reel fore/aft positioning, depending upon the type of header mounted on the harvesting machine.

The computer controller 12 comprises one or more programmable modules resulting in one or more processing modules and one or more memories which collectively define a memory 52 and a processor 50 of the controller, in which the processor is arranged to execute the programming instructions stored on the memory to perform the various functions outlined herein. In the instance of plural modules, typically a main computer module would perform most of the decision-making operations and execute most of the functions described herein while the secondary modules may communicate over a communications bus with the main computer module to be used for controlling command signals from the computer controller to the various actuator valves and for receiving feedback signals from various sensors 54 associated with the different operating characteristics of the harvesting machine.

Typically at least one sensor 54 is associated with each of the operational actuators described herein to generate a feedback signal comprised of a feedback value which relates to a position of the actuator in the instance of a linear actuator for controlling an operational characteristic relating to position such as height, or which relates to a speed of the actuator in the instance of a hydraulic motor for controlling an operational characteristic relating to a variable speed of movement such as wheel speed, cutter speed, draper speed, and the like.

The computer controller operates each actuator according to a prescribed operating value. By comparison of the feedback value to the prescribed operating value which is dictated by the computer controller, the computer controller can generate appropriate command signals for operating the electronic control valves of the actuators to control the actuators at the prescribed operating values.

In the instance of the DWA position actuator, the operating value comprises a position value which dictates the double windrow attachment being either fully raised or fully lowered for example.

In the instance of the compressor actuator, the operating value is a height value which may correspond to a fully raised position, a fully lowered position, or any one of a plurality of intermediate heights at various spacings between the fully raised and fully lowered positions.

In the instance of the float actuators, a single float value may dictate the position of both float actuators, or alternatively an individual float value may be designated for each of the left and right actuators. Differing individual float values may be used for providing balance to the header to compensate for the drapers being shifted between different operating configurations such as the left side configuration, the right side configuration, or the centre configuration.

In the instance of the header height actuators, the operating value is a prescribed header height which may relate to a fully raised position a fully lowered position, or any one of a plurality of intermediate heights at various spacings between the fully raised and fully lowered positions.

In the instance of the draper position actuators 32 and 34, a draper position value is sufficient to dictate whether the actuators should be fully extended or fully retracted. The computer controller is able to determine position of the drapers based on the command signals previously generated to position the drapers without any feedback sensor being required in this instance.

For operational actuators on the header, all electrical communication between the computer controller and the actuators passes through a suitable vehicle wiring harness 55 which connects to a header wiring harness in the form of a communication element 56 on the header. The communication element 56 on the header is a multi-pin connector which can be releasably connected to the vehicle wiring harness 55 independently of the mechanical mounting of the header frame onto the mounting assembly of the harvesting vehicle.

The pin configuration of the communication element 56 and the type of actuators connected thereto is typically unique for each model of header. When the wiring harness is connected with the communication element 56 on the header, the controller communicates with the communication element such that the communication element effectively outputs an identification signal to the computer controller which is representative of the identity of the header. The computer controller is thus able to autonomously identify the header by comparing the identification signal output from the header to known header profiles stored in the memory of the controller in which each header profile corresponds to an identity of a particular model of header.

A key activation device 58 is provided within the operator cab on the harvesting vehicle which also communicates with the computer controller. The key activation device can be actuated with a key by an operator between on and off states to enable operation of the harvesting vehicle when activated and to disable operation of the harvesting vehicle when deactivated.

An operator interface is provided within the operator cab also in communication with the computer controller. The operator interface includes a display housing 60 having a video display thereon providing a visual output to the operator as well as locating a plurality of operator inputs thereon for receiving command signals from the operator. The operator inputs on the display housing typically include a plurality of navigational inputs 62 for navigating menus, such as a scrolling input for scrolling through lists of menu items displayed on the display, a home button for returning to a high level menu, a return button for returning to a previous menu, and a plurality of soft keys associated with the display portion which can be customized to various functions.

The operator interface also includes a control handle 64 which receives drive commands from the operator and which includes a plurality of manual input buttons 66 for adjusting various operating values presented to the operator through the display, such as manual adjustment of various operating speeds, heights, or positions of the various components of the harvester machine.

The control handle 64 also locates a set of three programmable input buttons 68. Each programmable input 68 is actuable by a single touch of the operator. The programmable input 68 can be programmed to have one or more operating values associated therewith which can be programmed to a specific preset value for each associated operating value. Upon single touch actuation by an operator, all the associated operating characteristics are returned to the associated preset values that have been assigned when programming the programmable input button as described in further detail below.

In order to program the programmable inputs 68, a list of all the operational characteristics which can be associated with one of the individual programmable inputs is initially presented to the operator through the display. Using the navigational inputs, the operator can select which ones of the operational characteristics are to be associated with the programmable input. The programming of the computer controller is capable of detecting conflicting information such as the incompatibility between certain attachments and the header type so as to prevent the operator from selecting two incompatible operational characteristics to be associated with a single programmable input. Once the association has been made using the navigational inputs, the selected operational characteristics remain associated with the programmable input until a further selection step is performed. Accordingly, any further assignment of preset values to the selected items or subsequent use of the programmable input to return the selected operational characteristics to assigned preset values will always occur simultaneously or in a predetermined sequence across all selected operational characteristics.

In order to assigned preset values to the operational characteristics which have been previously associated with the programmable input, the operator presses and holds the programmable input in a depressed state for a duration which exceeds a prescribed duration programmed onto the main controller. In response to the programmable input being activated for a duration exceeding the prescribed duration, all operational characteristics that have been selected as being associated with the programmable input will have a preset value assigned to it which corresponds to the current operating value of that operational characteristic.

Once the preset values have been set, a subsequent single touch actuation by an operator of the programmable input for a duration which is less than the prescribed duration will return all of the selected actuators associated with the input to the previously assigned preset values.

In the event that the computer controller detects that the feedback sensor associated with one of the operational actuators that has been selected for a programmable input has failed or is an operative for any reason, the programmable input remains functional for returning other operational characteristics to their preset values, however the operational characteristic associated with the failed sensor is disabled from any actuation by the programmable input until the sensor failure has been resolved. In the event of a detected sensor failure, resulting in de-selection of the operational characteristics from the programmable input, a suitable notification is generated by the computer controller which is directed to the operator through the display.

Using the navigational inputs, the operator can also customize various functions of the machine. For example, the prescribed duration which must be exceeded for assigning preset values to the programmable inputs can be adjusted through a separate set of settings menus so that the prescribed duration can be customized to the preference of the operator. In addition, the rate of change of the position of various linear actuators, such as the header height actuators can be customized by the operator. More particularly the rate of change of the position of the various linear actuators in response to a programmable input can be customized independently of the rate of change of the position of the various linear actuators in response to operator commands to change the values using the manual inputs.

Among the various operational characteristics, the header height is the characteristic most typically associated with the programmable inputs. Furthermore, the header height typically includes one or more additional operational characteristics associated therewith.

Among the characteristics which are desired to be associated with the header height, the programming instructions on the controller allow an operator to select the height of the header and the position of the double windrow attachment to be assigned together to a single programmable input. The header height actuator and the DWA position actuator may be actuated simultaneously to lift up to a raised or partially raised position. Optionally the DWA position actuator may be actuated by a command signal from the computer controller at a timed delay of fixed duration, or a variable duration based on the identified width of the header, following the actuation of the header height actuator to raise the header to ensure that all cut crop material is able to be cleared from the header onto the double windrow attachment and to be cleared from the double windrow attachment before the double windrow attachment is fully raised.

Alternatively, when using a header having drapers which can be shifted by deck shift actuators 32 and 34, these deck shift actuators are preferably assigned to a programmable input together with the header height actuator in place of the DWA position actuator. The command signals generated by the computer controller which actuate the displacement of the deck shift actuators occurs subsequent to expiry of a fixed time delay following the actuation of the header height actuators to ensure that all cut crop material is cleared from the header prior to the shifting of the drapers. Optionally, the time delay may be adjusted according to the width of the identified header.

When using a crop compressor, the compressor actuator can also be assigned to the same programmable input as the header height actuator. The compressor height value in this instance may be a fully raised position, or any intermediate height setting among a plurality of intermediate heights throughout a range between the fully raised and fully lowered positions of the compressor. The computer controller in this instance also generates command signals for lifting the crop compressor at a timed delay following the actuation of the header height actuators for raising the header, however the duration of the delay in this instance is typically based on header type and ground speed of the vehicle. More particularly, the computer controller in this instance stores a plurality of header ID profiles thereon which specify a desired distance along the ground which the harvester vehicle should travel subsequent to raising of the header prior to raising of the compressor. The computer controller is thus programmed to determine the prescribed distance delay associated with the current header mounted on the harvester vehicle, followed by calculation of the time duration required by using the prescribed distance delay and the wheel speed acquired from the sensors associated with the wheel motors. Once the calculated time duration has expired, the computer controller will actuate the lifting of the compressor following the lifting of the header in response to a single touch actuation of the programmable input by the operator.

The preset values associated with the programmable inputs are recorded in the computer controller within the header profile corresponding to the currently identified header. Accordingly, the header must be identified through the communication element on the header to identify the correct header before the programmable inputs are operational. Once programmed, the preset values assigned to the programmable inputs remain stored in the header profile until a new programming cycle is initiated by the operator when the corresponding header is mounted on the harvester machine. If the header is removed and a different header is mounted onto the harvesting vehicle for identification by the computer controller, the programmable inputs will revert to the last known settings stored in the header profile for the newly identified header. When the previous header is returned to the mounted position on the harvesting vehicle, the computer controller will again recall the assigned preset values associated with the programmable inputs when that header was previously mounted on the harvesting machine.

Each of the programmable input buttons are uniquely identified and can be programmed independently of one another using the similar technique of selecting operational characteristics to be assigned to each input followed by a press and hold step to assign the preset values to the current operating values of the assigned operational characteristics. There is an audible tone to confirm to the operator that the current settings have been saved to that programmable input button. The header height is generally always saved, however, all other settings are typically toggled between selected and unselected states from a menu. Operational characteristics may include but are not limited to header tilt, deck position and/or header float selection, swath compressor, double windrow attachment height, double windrow attachment speed, knife speed, drapers speed, reel speed, reel height, reel for/aft, disc speed, and preset timing. If a sensor is disabled or locked, it will be grayed out on the visual display such that it will not be selectable and an appropriate indication of the disabled or locked status will be shown on the display.

If the feedback from the header height sensor disappears, for example the sensor is disabled or faulty, all programmable input buttons will typically be fully disabled. Any attempt to actuate results in a notification to the operator indicating that the header height sensor is disabled. Options are provided for the operator to re-enable the height sensor.

The header height is typically able to be controlled manually with two positions of a four-way switch on the control handle. The display includes suitable icons for displaying the header height including a scale representing the full range of height between fully up and fully down positions. A numerical display provides a height value for the operator in addition to the scale display for graphically representing the height between the fully up and fully down positions. When the height of the header corresponds to one of the preset values associated with one of the programmable input buttons, the unique identification of that programmable input button is also displayed on the graphical display. If using the four-way header raise and lower switch, the computer will override the preset value and change the height to the manually set height.

If in the process of obtaining preset values, the process is interrupted for any reason, the process is fully cancelled and the operator would have to reinitiate the programming routine.

With regard to identification of the header by the computer controller, the programming instructions are arranged to communicate with the communication element 56 on the header specifically for purposes of identifying the header only immediately subsequent to activation of the key activation device 58 to a key-on or activated position. Provided the activation device remains in the key-on or activated position, the computer controller will lock in the identified header identity regardless of whether or not there is a subsequent change in the output signal from the header. Accordingly, any change in the output signal while the activation device remains in the activated position is assumed to be the result of a fault such as a pin contact error for example.

When connecting a new header to the harvester vehicle, the float actuators are typically initially in an inactive state to enable the mechanical connection of the header to the mounting assembly on the harvesting vehicle. The operator then connects the wiring harness of the harvesting vehicle to the communication element 56 on the header. Once they mechanical and electrical connections are complete, the operator should then activate the float actuators so that the floating suspension is in an active state. When disconnecting the header, the operator must initially inactivate the float actuators to remove stress from the mechanical connections of the header to the mounting assembly of the harvesting vehicle prior to disconnecting the mechanical and electrical connections.

The programming instructions of the computer controller are programmed to generate various notifications to the operator relating to the float actuators if certain criteria are met. Firstly, the computer controller verifies that the sensors associated with the float actuators are active and functioning before generating any notifications. In the instance that a header identity is detected in connection with the wiring harness but the float actuators remain inactive, a notification prompt will be directed to the operator instructing the operator to activate the float. Alternatively, if the wiring harness is disconnected from the communication element on the header such that no header identification is detected, but the float actuators are determined to be in an active state, then the computer controller determines that a notification prompt will be directed to the operator which instructs the operator to deactivate the float actuators.

As noted above, the header identity is typically only determined by the computer controller immediately following activation of the key activation device. Upon each activation of the key activation device, the computer controller will receive an identification signal from the communication element on the header corresponding to a header identity, and this header identity is compared to the last previously known header identity stored on the computer controller. If the current header identity matches the last previously known header identity, then the computer controller proceeds to recall from memory the header profile associated with that identity which includes preset values for several operating characteristics of the harvester machine.

Alternatively, if the current header identity differs from the last known header identity stored in the computer controller memory, the programming instructions are arranged to generate a prompt for the user requesting the user confirm the identity of the header. In this instance, the operator may confirm the last known header identity as the current identity for use by the computer controller instead of the currently misidentified header. Alternatively, the operator may be provided with an opportunity to select from a list of known header identities stored on the computer controller to identify the current header attached to the harvesting machine.

Examples of operating parameters stored within the header profile that are recalled autonomously by the computer controller includes float values for determining the position of the float actuators to provide the appropriate lifting force for partially balancing that particular header in floating engagement upon the ground.

In addition to the various operating values which can be preset in the lists described above, other operating parameters which can be stored within the header profile in association with the header identity include a cut width setting which identifies a cutting width of the header. In this instance a cutting value is stored on the computer controller in association with the identity of the header such that the cutting width value is assigned as the cut width setting for other operations relaying on cut width autonomously in response to determination of the identity of the header.

Other operating parameters include the operating speed of various components including attachments such as a double windrow attachment, or the position of various attachments, for example the operating height of a crop compressor. In each instance these additional operating parameters are stored in the header profile in association with the header identity.

As the harvesting machine is used, the hours of usage, and the crop area which has been covered by the harvesting machine in operation are recorded by the computer controller and stored as a cumulative total within the header profile associated with the header identity each time the header is used. When using multiple different headers with different identities, the hours of usage and crop area which has been covered is only added to the cumulative total of the header profile having an identity matching the identity of the current header in use.

In this instance, each header profile may further include maintenance data stored thereon such as a maintenance schedule of recommended maintenance to be performed on the header based on hours of usage and/or crop area covered. Maintenance notifications are typically arranged to be generated by the computer controller according to the maintenance schedule when the corresponding intervals of usage hours and/or crop area coverage are reached. Only the usage hours logged in association with the identity of the currently used header are compared to the maintenance data associated with the same header identity to determine when maintenance notifications should be generated for the operator.

The header wiring harness that defines the communication element 56 on the header is fitted with circuits that send a binary signal to the windrower which is designed to then respond appropriately for each header. The system detects the header identity each time the key is turned on and if the header identity changes during a particular run, that header ideas locked in until the key is turned off. This prevents nuisance erroneous header identity during the operation of the machine in the event of an intermittent connection in one of the circuits. Each header type has different requirements for how the hydraulic power is supplied to the header. Within the group of draper header sizes, although the hydraulic logic is the same, the hydraulic flow rates are different depending on the header width. Besides system hydraulic functionality and speeds, the unique header identity opens the possibility for controlling other header specific functions. One example is to limit the attachment of a double windrow attachment to disc and auger headers. Also, when calibrating functions, header identity determines which sensors are calibrated. Other items remembered by the header identity are lockout functions, header speeds, float settings and the like. If header float for example is not set correctly, it will result in excessive wear or damage to the header and unnecessary power consumption.

Upon connection of a new header not previously identified, the operator can select from a menu presented on the display to indicate that a new header or that a previously set up header is to be modified. Once the operator picks a header to set up and puts that header to the top of the list, the operator can open up the cut width options, the attachment options, and the raise and lowering rates options. The effective cut width programmed into the header profile is used in calculation of area cut. The amount of overlap is indicated to the operator by a calculating a value based on the maximum cut width minus the programmed width.

The navigational inputs on the menus further allow an operator to scroll through various selections to be associated with the header including a first lowering rate, a second lowering rate, a first raising rate, and a second raising rate, all of which are associated with the manual inputs. The operator can also scroll through selections for raising and lowering rates for the programmable input buttons independently of the manual input selections. All the selected rates remain customized to the currently identified header within the corresponding header profile stored on the computer controller.

Headers can also be programmed to have certain attachments associated therewith. In one example a hay conditioner can be associated with the header. Alternatively a double windrow attachment can be selected in association with the header. The double windrow attachment operating speed and up or down position can be controlled either using the manual inputs of the operator interface, by relying on the operating values being assigned to one of the programmable inputs as noted above, or by reassigning the reel height and for/aft position switches to control the functions of the double windrow attachment.

Upon each activation of the key activation device, the computer controller looks for the header identity. If no header is identified, the system provides options to the operator relating to disengagement of the header. Alternatively, if a header identity is detected, the comparison made to the last previously known header identity is made. If the header identity has not changed, then the system again provides options for disengaging the header to allow for seamless removal and reinstallation of the same header without operator intervention, such as during transport. Alternatively, if the header identity has changed then suitable notifications are presented to the operator to notify the operator that a new identity has been detected so that the operator has an opportunity to force an identity upon the computer controller rather than relying on the currently detected identity.

The programming instructions may be further arranged to present a graphical schematic on the display representative of which pins of the pin connector of the communication element on the header are being identified. The operator can compare what the currently identified pins are in relation to which contact pins should be identified if the correct header was connected. The operator can identify which pin is providing improper contact in this instance for diagnosing where the fault is in a mis-identified header.

When the wiring harness of the header is disengaged and no valid header identity is detected but both float sensors are working and the header float has not been dumped, then the notification criteria has been met for notifying the operator with a message that the header disconnect has been detected. The operator is then prompted to dump the float pressure for the float actuators.

When a valid header identity has been established, if both float sensors are working and the header float has been dumped, then a message will appear to advise the operator that a header attachment is detected, followed by prompting the operator to resume activation of the float actuators.

When numerous header profiles are stored on the computer controller, the operator has the ability to recall all of the usage data associated with the numerous header profiles as a table displayed within the display of the display housing. The table will include the header identity name, the size of the header, the total area for each header, and the total area for each header. Each header also includes a subtotal which can be reset to zero at any time for tracking smaller individual usages of the header if desired. A subroutine is also provided for resetting the cumulative total area and the cumulative hours of usage for each header. This is particularly useful where an operator acquires a new header having the same identity as a previous header so as to prevent usage data of the new header being added on in a cumulative manner to the usage data of the previous header.

Since various modifications can be made in my invention as herein above described, and many apparently widely different embodiments of same made, it is intended that all matter contained in the accompanying specification shall be interpreted as illustrative only and not in a limiting sense.

The invention claimed is:
1. In a harvesting machine comprising:
a harvesting vehicle mounted on ground wheels for movement across ground carrying a crop for harvesting;
a header having a cutter bar for cutting the crop and a crop transport device for transporting the cut crop to a collection location of the header;
a mounting assembly supporting the header on the harvesting machine;
the mounting assembly including a float actuator operable between an inactive state in which the header is rigidly supported relative to the harvesting vehicle and an active state in which the float actuator applies a variable lifting force to the header throughout a range of floating movement of the header relative to the harvesting vehicle such that the header is partially supported by ground lifting forces from the header being engaged upon the ground in the active state;
a computer controller on the harvesting vehicle including a memory storing programming instructions thereon and a processor for executing the programming instructions stored on the memory;
the computer controller being in communication with the float actuator so as to be arranged to determine when the float actuator is in the active state and when the float actuator is in the inactive state; and
a communication element on the header arranged to connect with the computer controller independently of the mounting assembly supporting the header on the harvesting vehicle;
the improvement comprising:
the computer controller being arranged to automatically identify the header when the communication element of the header is connected with the computer controller in which the communication element outputs an identification to the computer controller representative of the identity of the header; and
the programming instructions being executable by the processor so as to be arranged to generate a notification to the user responsive to notification criteria stored on the computer controller being met, wherein the notification criteria comprises at least one of:
(i) the computer controller receiving the identification from the communication element on the header while the float actuator is determined to be in the inactive state; or
(ii) the computer controller determining that the communication element on the header is not connected with the computer controller while the float actuator is determined to be in the active state.

2. The improvement according to claim 1 wherein the notification criteria comprises the computer controller receiving the identification from the communication element on the header while the float actuator is determined to be in the inactive state and the notification is a prompt delivered to the user to activate the float actuator.

3. The improvement according to claim 1 wherein the notification criteria comprises the computer controller determining that the communication element on the header is not connected with the computer controller while the float actuator is determined to be in the active state and the notification is a prompt delivered to the user to deactivate the float actuator.

4. The improvement according to claim 1 further comprising a key activation device on the harvesting computer to enable operation of the harvesting vehicle when activated, wherein the programming instructions on the computer controller are arranged to automatically identify the header subsequent to the key activation device being activated.

5. The improvement according to claim 4 wherein the programming instructions on the computer controller are arranged to only identify the header immediately subsequent to the key activation device being activated.

6. The improvement according to claim 1 wherein the harvesting machine further comprises a float sensor arranged to determine a status of the float actuator and output a float signal to the computer controller representative of the status of the float actuator, wherein the improvement further comprises the notification criteria further comprising confirmation that the float sensor is functioning prior to generation of the notification to the user.

7. The improvement according to claim 1 further comprising a prescribed float value stored on the computer controller in association with the identity of the header, wherein the programming instructions are arranged to operate the float actuator such that the variable lifting force corresponds to the prescribed float value associated with the identity of the header subsequent to determination of the identity of the header.

8. The improvement according to claim 1 wherein the computer controller of the harvesting machine further comprises a programmable input adapted to return operation of an operating characteristic of the header to a prescribed preset value when actuated, wherein the improvement further comprises:

the prescribed preset value being stored on the computer controller in association with the identity of the header; and the programming instructions being arranged to assign the prescribed preset value to the programmable input in response to determination of the identity of the header.

9. The improvement according to claim 8 wherein the mounting assembly is arranged to adjust a height of the header relative to the harvesting vehicle in a raised position of the header and the operating characteristic of the programmable input comprises said height of the header, and wherein the prescribed preset value stored in association with the identity of the header is a height value for returning the header to the height value when the programmable input is actuated.

10. The improvement according to claim 1 wherein the header further comprises a cutter motor for operating the cutter bar at a prescribed header speed dictated by the computer controller, and wherein the improvement further comprises:

a header speed value stored on the computer controller in association with the identity of the header; and the programming instructions being arranged to recall the header speed value for operating the cutter motor at said header speed value in response to determination of the identity of the header.

11. The improvement according to claim 1 wherein the computer controller comprises a cut width setting stored thereon for identifying a cutting width of the header, and wherein the improvement further comprises:

a cutting width value stored on the computer controller in association with the identity of the header; and the programming instructions being arranged to assign the cutting width value stored in association with the identity of the header as the cut width setting in response to determination of the identity of the header.

12. The improvement according to claim 1 wherein the computer controller comprises an attachment setting stored thereon for identifying an operational characteristic of an attachment supported on the harvesting vehicle, and wherein the improvement further comprises:

an attachment value stored on the computer controller in association with the identity of the header; and the programming instructions being arranged to assign the attachment value stored in association with the identity of the header as the attachment setting in response to determination of the identity of the header.

13. The improvement according to claim 1 wherein the programming instructions are executable by the processor so as to be arranged to:

(i) store a current identity of the header on the computer controller upon receipt of the identification;

(ii) compare the current identity of the header to a previously stored identity of the header to determine if the identify of the header has changed;

(iii) prompt the user through an operator interface of the computer controller to confirm the identity of the header if the identity of the header has changed.

14. The improvement according to claim 1 wherein the programming instructions are executable by the processor so as to be arranged to log usage hours of the header on the computer controller in association with the identity of the header.

15. The improvement according to claim 14 wherein the computer controller includes maintenance data stored thereon in association with the identity of the header, the maintenance data relating to a maintenance schedule representative of maintenance notifications to be generated by the computer based upon a number of hours of operation of the header, the programming instructions on the computer controller being arranged to compare only the usage hours logged in association with the identify of the header to the maintenance data associated with the identity of the header in the generation of the maintenance notifications.

16. The improvement according to claim 13 further comprising a key activation device on the harvesting computer to enable operation of the harvesting vehicle when activated, wherein the programming instructions on computer controller are arranged to automatically identify the header only immediately subsequent to the key activation device being activated.

17. The improvement according to claim 13 wherein subsequent to prompting the user to confirm the identity of the header, the programming instructions on the computer controller are further arranged to determine the identity of the header as the previously stored identity of the header instead of the identity that corresponds to the identification from the communication element responsive to an operator command received through the operator interface.

* * * * *